United States Patent [19]

Carpenter, Jr.

[11] 4,257,180
[45] Mar. 24, 1981

[54] MICROFICHE VIEWER

[75] Inventor: Robert A. Carpenter, Jr., Capistrano Beach, Calif.

[73] Assignee: AM International, Inc., Los Angeles, Calif.

[21] Appl. No.: 86,740

[22] Filed: Oct. 22, 1979

[51] Int. Cl.³ .............................................. G02B 27/02
[52] U.S. Cl. ......................................... 40/362; 40/19; 40/367; 350/90; 350/241
[58] Field of Search ............... 40/367, 366, 365, 364, 40/363, 362, 361, 334, 335, 19, 324; 353/27 R; 350/90, 241, 247

[56] References Cited

U.S. PATENT DOCUMENTS

| | | | |
|---|---|---|---|
| 1,097,013 | 5/1914 | Genter | 40/367 X |
| 2,553,160 | 5/1951 | Arps | 40/367 X |
| 2,674,152 | 4/1954 | Wilkinson | 350/241 X |
| 3,384,436 | 5/1968 | Kunnel | 40/364 X |
| 3,626,617 | 12/1971 | Frey | 40/367 |
| 3,710,488 | 1/1973 | Baxter | 350/241 |
| 4,089,953 | 5/1978 | Bernard et al. | 350/241 X |
| 4,149,776 | 4/1979 | Everett, Jr. | 40/364 |

FOREIGN PATENT DOCUMENTS 1072838  9/1954  France ........................................ 40/366

Primary Examiner—John F. Pitrelli
Attorney, Agent, or Firm—A. W. Karambelas; R. C. Curfiss; M. L. Hopkins

[57] ABSTRACT

A portable microfiche viewer is provided for viewing a selected image frame of a microfiche arranged in a cylindrical configuration. The viewer comprises a cylindrical translucent outer wall, a cylindrical transparent inner wall positioned within the outer wall and a transparent cylinder adapted to be manually rotated and axially movable within the inner wall. A microfiche to be viewed is positioned on the periphery of the cylinder and is rotatable therewith for positioning a selected column of the microfiche into a viewing path or aperture extending perpendicularly to an optical path of a lens means mounted on the outer wall. The lens means is movable in a path parallel to the viewing path to a selected row of the microfiche for viewing the selected image frame of the microfiche directly through the lens means.

11 Claims, 6 Drawing Figures

MICROFICHE VIEWER

BACKGROUND OF THE INVENTION

Film readers for projecting an image onto a screen in which the image is contained on a microfiche are well known in the art. With respect to film readers used in conjunction with microfiche transparencies, the transparency is normally mounted on a carrier slidably movable relative to the optical axis of a lens to position a selected image frame in relation to the optical axis. Generally, the microfiche is placed between glass plates to maintain the microfiche in a flat plane throughout its movement to locate a selected image frame. Such apparatus is fairly complex and does not lend itself to the construction of a compact, portable low cost microfiche reader.

Other forms of so called portable microfiche readers are shown in U.S. Pat. Nos. 3,718,390 and 3,851,960. While the devices disclosed in these patents are portable in the sense that they may be carried from one location to another, because they include projection and display means which add to the cost and bulkiness of the devices, they are not inexpensive, compact readers of the kind adapted to be hand-held during operation as in the present invention.

Still another microfiche viewer is shown in U.S. Pat. No. 4,149,776. While this device is portable and adapted to be hand-held during operation, it does not provide means for readily selecting a desired image frame of the microfiche to be viewed. Thus, the device comprises a slide tube having a window near one of its ends which acts as a film gate, a mirror positioned in line with the window, a magnification and an eyepiece lens and a transparent tube for supporting a microfiche mounted within a diffuser tube.

To view a desired image frame, it is necessary to rotate the slide tube until the window lines up with a selected column of the microfiche, and then move the slide tube axially until the image frame of a selected row of the microfiche is in line with the window. The image is then viewed through the slide tube which forms anoptical path. Such an arrangement results in a trial and error method of locating the desired image frame to be viewed and, additionally, requires accurate alignment of the window with the image frame in order to reflect the image from the mirror to the optical path.

SUMMARY OF THE INVENTION

The present invention provides a portable microfiche viewer and, more specifically, a microfiche viewer which provides for accurate and rapid selection and alignment of a selected image frame of a microfiche to be viewed.

The viewer comprises a cylindrical translucent outer wall mounted on a base and a cylindrical transparent inner wall coaxial within the outer wall. A transparent, hollow cylinder is coaxial within the inner wall and is adapted to be manually rotated and axially movable. The cylinder periphery provides a clearance with the inside diameter of the inner wall to position a microfiche to be viewed on the periphery of the cylinder. The cylinder is also interconnected with the inner wall to impart rotation to the inner wall in response to rotation of the cylinder.

The microfiche is positioned on the cylinder by partially withdrawing the cylinder axially from the inner wall, from a home position to an extended position, wrapping the microfiche around the periphery of the cylinder and returning the cylinder to the home position to place the microfiche in position for viewing. By rotating the cylinder, in relation to selection means provided on the viewer, a desired column of the microfiche is positioned in a viewing path extending parallel to the center axis of the cylinder and perpendicularly to an optical path of a lens means mounted on the outer wall.

The lens means is manually movable in a path parallel to the viewing path to any one of a plurality of selected detented positions, in relation to indicia provided on the viewer, each position corresponding to a row of the microfiche. Thus, the lens means is movable in either direction to a selected indicia position to thereby accurately place the optical path of the lens means at a location for viewing a selected image frame directly through the lens means.

The viewer may also be provided with an illuminating source to permit viewing of the microfiche under dark conditions. The viewer is preferably constructed of transparent material which provides for entry of sufficient light under normal daylight conditions or artificial room lighting for viewing the microfiche. However, in those instances where the lighting conditions are insufficient for viewing the microfiche, the illuminating source may be activated to allow for viewing the microfiche.

It is an object of the present invention to provide a portable, hand-held microfiche viewer for viewing microfiche arranged in a cylindrical configuration.

Another object is to provide a microfiche viewer which provides for easy and accurate selection and positioning of a desired image frame of the microfiche to be viewed.

Another object is to provide a conventional and inexpensive lens means for viewing the microfiche directly through the lens means, thereby obviating the bulk and cost normally associated with viewers requiring the use of projection and display apparatus.

A feature of the invention is to provide a microfiche viewer which is simple in construction and use, extremely compact, reliable in operation and inexpensive to produce.

Other objects, features and advantages of the invention will appear hereinafter as the description proceeds.

IN THE DRAWING

DESCRIPTION OF THE PREFERRED EMBODIMENT

Figure 1:
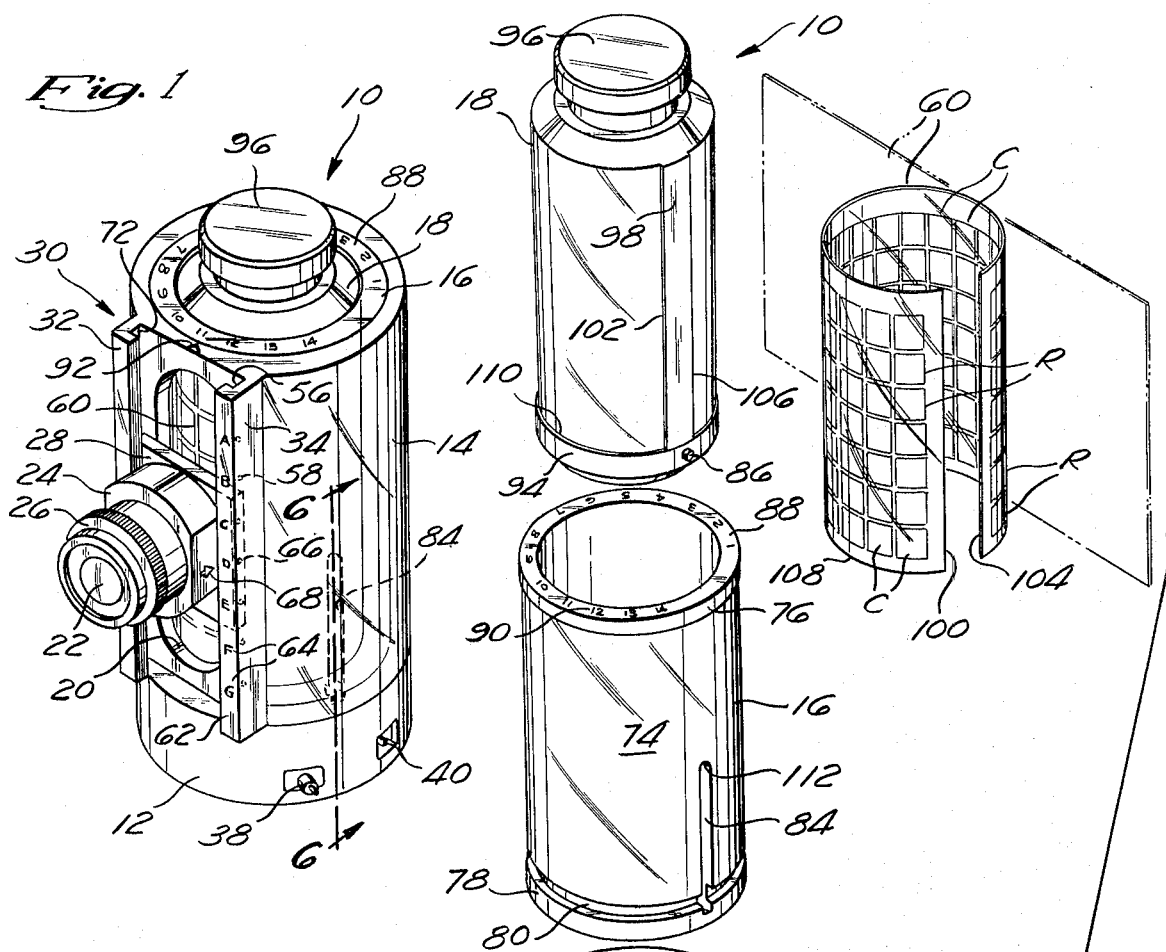
FIG. 1 is a perspective view of a microfiche viewer in accordance with the present invention.
Figure 2:
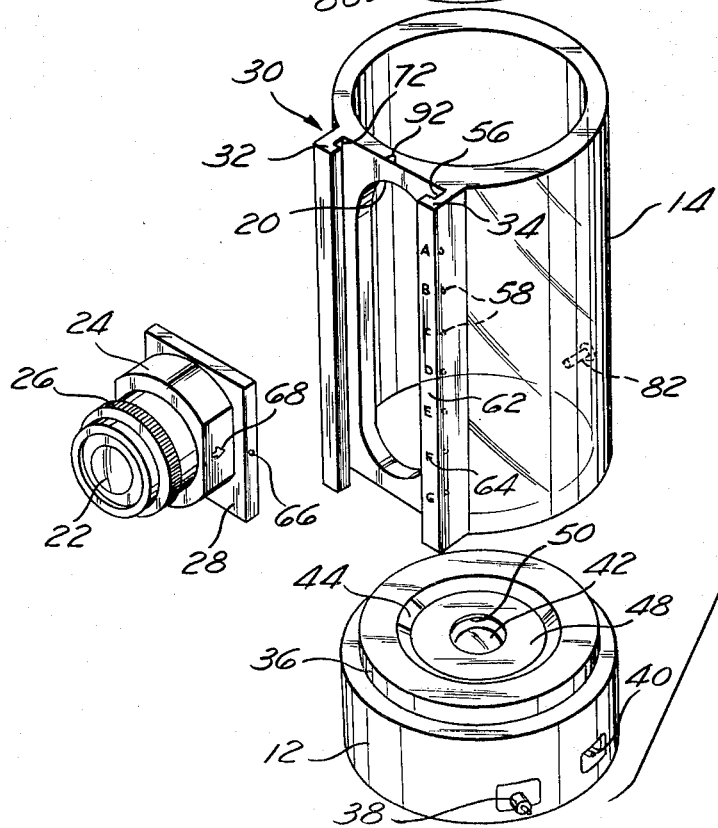
FIG. 2 is an exploded view of the microfiche viewer including a microfiche which has been rolled into a cylindrical configuration it would assume during a viewing operation.

With reference to FIGS. 1 and 2, the microfiche viewer is indicated generally by the reference numeral 10 and comprises a base 12, a cylindrical translucent outer wall 14, a cylindrical transparent inner wall 16 and a hollow transparent cylinder 18. Preferably, the inner wall 16 is made of optically clear material.

Figure 6:
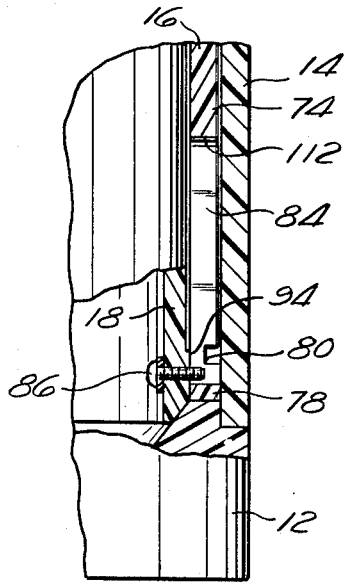
FIG. 6 is a fragmentary section taken substantially along the line 6—6 of FIG. 1.
Figure 4:
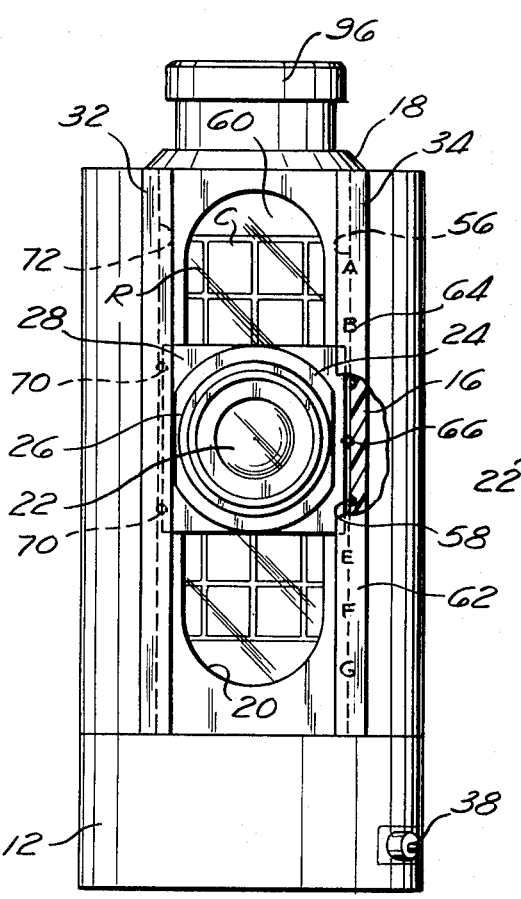
FIG. 4 is a front elevation partially in section.
Figure 5:
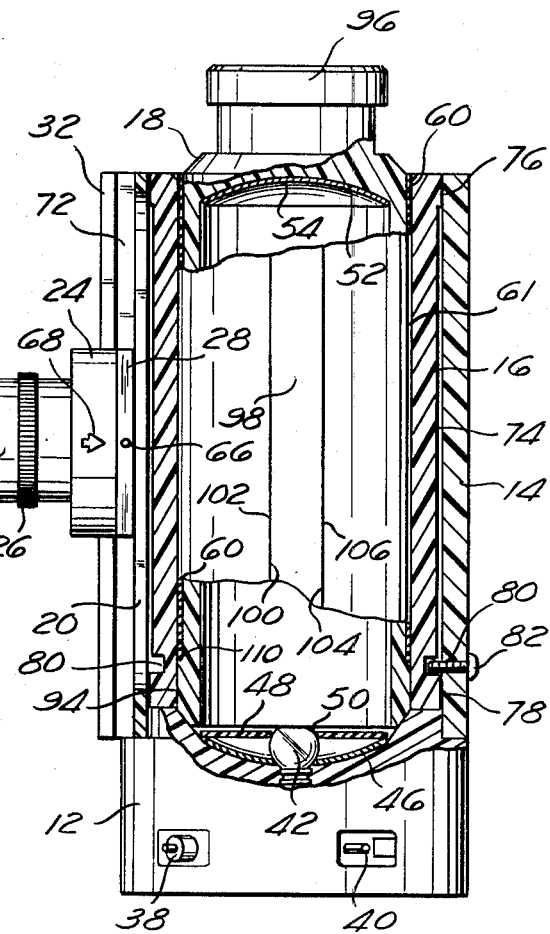
FIG. 5 is a side elevation partially in section.

As best shown in FIGS. 1, 2 and 4, the outer wall 14 is provided with an elongate opening 20 extending axially to the outer wall 14 to provide a window for a lens means 22. The lens means 22 comprises a lens holder 24, an adjusting means 26 for focusing the lens means and a slide plate 28 for movably supporting the lens means for manual movement axially to the outer wall 14. The lens means 22 is mounted exteriorly of the outer wall 14 by positioning the slide plate 28 within a guide means indicated generally by the reference numeral 30 formed by a pair of parallel flanges 32 and 34 straddling the elongate opening 20. As shown in FIGS. 2, 5 and 6, the outer wall 14 is mounted on the base 12 by providing a snug fit of the inside surface of the outer wall with a turned shoulder 36 on the base 12.

The base 12 may also include a conventional electrical rechargeable unit, not shown in the drawing, including a selectively actuable on-off switch 38, an outlet receptacle 40 for recharging the unit and a light bulb 42, as best shown in FIG. 2. Thus, in those instances where there is insufficient daylight or artificial room light to view the microfiche, the light bulb 42 may be energized through the switch 38 to permit viewing the microfiche under dark conditions.

With reference to FIGS. 2 and 5, the base 12 is also provided with a dished-out portion 44 for receiving a reflector 46 having a a central aperture for the light bulb 42. To diffuse the light from the reflector 46 there is provided a translucent disc 48 overlying the reflector 46 also provided with a central aperture 50 to expose the light bulb 42. Similarly, and as shown in FIG. 5, the hollow cylinder 18 is provided at its upper end with a dished-out portion 52 for receiving a reflector 54 in alignment with the reflector 46. The reflectors 46 and 54 may be cemented or glued in place.

As shown in FIGS. 1–4, one of the flanges such as the flange 34 is provided on an inner surface 56 thereof with a series of detents 58 positioned in spaced apart relation corresponding to the spacing of rows R of image frames on a microfiche 60. For the purpose of this disclosure, and as shown in FIG. 2, the microfiche 60 comprises seven horizontal rows R and fourteen verticle columns C of image frames for a total of 98 image frames. A front surface 62 of the flange 34 is provided with indicia 64, in association with the detents 58, such as the letters A through G, each letter corresponding to a row R of image frames. With the lens holder 24 slidably mounted in the guide means 30 as described supra, a spring-loaded ball detent 66 on the slide plate 28 coacts with the detents 58 to retain the lens means 22 in a selected viewing position. Thus, if the image frame to be viewed were in the third row R from the top of the microfiche 60, the lens means 22 is moved to position a pointer 68 on the lens holder 24 (FIGS. 1, 2 and 5) in line with the letter C of the indicia 64.

Figure 3:
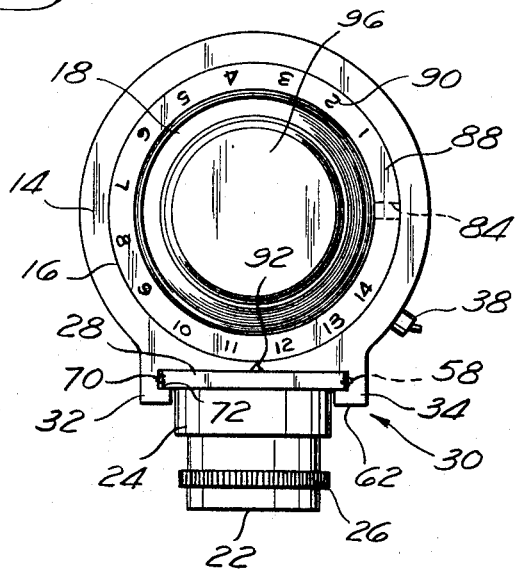
FIG. 3 is a plan view of the microfiche viewer.

Further, and as shown in FIGS. 3 and 4, the slide plate 28 is provided at the side opposite the ball detent 66 with a similar pair of spring-loaded ball detents 70. The ball detents 70 act against an inner surface 72 of the flange 32 to support the lens holder 24 in the guide means 30 and to facilitate sliding movement of the lens holder 24 within the guide means 30.

As shown in FIGS. 2, 5 and 6, the inner wall 16 comprises a cylindrical body 74 having an enlarged circumferential portion 76 at one end and a similar enlarged portion 78 at the other end. The enlarged portions 76 and 78 provide a sliding fit or locating diameters with the inside surface of the outer wall 14 to prevent frictional drag of the inner wall 16 with the inside surface of the outer wall 14 during rotation of the inner wall in response to manual rotation of the cylinder 18.

The body 74 also includes an annular groove 80 adjacent and above the enlarged end 78, as shown in FIGS. 2 and 5. A retainer 82 is provided in the outer wall 14 and projects into the groove 80 to secure the inner wall 16 to the outer wall 14 while permitting rotation of the inner wall within the outer wall. As shown in FIGS. 2 and 6, the body 74 is also provided with an elongate slot 84 extending axially thereto from the enlarged portion 78 to approximately the mid point between the enlarged portions 76 and 78. The slot 84 provides for the reception of an end of a retainer 86 (FIGS. 2 and 6) on the cylinder 18 to thereby provide an interconnecting means to interconnect the inner wall 16 with the cylinder 18 and impart rotation of the inner wall in response to rotation of the cylinder.

An upper surface 88 of the enlarged portion 76 of the inner wall 16 is provided with selection means 90 in the form of indicator means 1 through 14 as shown in FIGS. 1, 2 and 3. Each of the indicator means corresponds to a column C of image frames of the microfiche 60. As will be further described hereinafter, in response to rotation of the inner wall 16 by rotating the cylinder 18, a selected one of the indicator means of the selection means 90 is aligned with an index means 92 on the outer wall 14 to thereby place a selected column C of image frames of the microfiche 60 into a viewing path or aperture extending parallel to the center axis of the cylinder 18 substantially the entire length of the elongate opening 20 and perpendicularly to the optical path of the lens means 22.

As best shown in FIGS. 2 and 5, the cylinder 18 is coaxial within the inner wall 16 with the end of the retainer 86 projecting into the slot 84 to provide an interconnection between the cylinder 18 and the inner wall 16 as stated supra. The lower end of the cylinder 18 is provided with an enlarged circumferential portion 94 providing a locating diameter with the inside surface of the inner wall 16, and the upper end of the cylinder is provided with a knob 96 adapted to be grasped for partially withdrawing the cylinder from the inner wall 16 and for rotating the cylinder.

A register strip 98 is provided on the periphery of the cylinder 18, to permit accurate positioning of a microfiche 60 on the cylinder, and extends from the enlarged portion 94 substantially the full axial length of the cylinder 18. With reference to FIG. 2, the register strip 98 is positioned in alignment with the retainer 86 and the elongate slot 84. The microfiche 60 to be viewed is wrapped around the periphery of the cylinder 18 with the columns C of the image frames extending parallel to the center axis of the cylinder. An end 100 of the microfiche 60 is placed in abutting relation with an edge 102 of the register strip 98 and an end 104 of the microfiche is positioned against an edge 106 of the register strip 98. This positioning and registration of the microfiche 60 with respect to the register strip 98 provides accurate alignment of the columns C of image frames of the microfiche with the corresponding selection means 90 for quickly and easily positioning a desired column of the microfiche into the viewing path of the lens means 22. The rows R of the image frames are similarly aligned with the indicia 64 by positioning a bottom edge 108 of the microfiche 60 against a ledge 110 provided by the enlarged portion 94 of the cylinder 18.

Because standard microfiche 60 varies in thickness from about 0.005 to 0.007 inch, the diameter of the cylinder 18 is made about 0.010 inch smaller than the diameter of the enlarged portion 94. This provides sufficient clearance 61 (FIG. 5) between the periphery of the cylinder 18 and the inside surface of the inner wall 16 for positioning the microfiche 60 on the periphery of the cylinder 18 and avoids scratching or marking the image frames of the microfiche during operation of the viewer 10.

In the operation of the viewer 10, the knob 96 of the cylinder 18 is grasped and the cylinder is withdrawn from the inner wall 16 from the home position shown in FIGS. 1, 3, 4 and 5 to the extended position (not shown in the drawing) whereat the retainer 86 abuts an end 112 of the elongate slot 84 of the inner wall 16. The microfiche 60 is then wrapped around the periphery of the cylinder, from the position shown in phantom to the position shown in full lines in FIG. 2, with the ends 100 and 104 and the bottom edge 108 of the microfiche 60 positioned against the register strip 98 and the ledge 110 respectively. While holding the microfiche 60 in this position, the cylinder 18 is returned to the home position within the inner wall 16.

For example, to view the image frame in "column 5", row D of the microfiche 60, the cylinder 18 and the inner wall 16 are rotated to position the indicator means 5 of the selection means 90 in line with the index means 92 on the outer wall 14 to thereby position the "column 5" into the viewing path of the lens means 22. During rotation of the cylinder 18, the inner wall 16 is guided in its rotative movement by the retainer 82 coacting with the groove 80. This arrangement also prevents axial movement of the inner wall 16 which could cause misalignment of the rows R of image frames of the microfiche 60 with the optical path.

Following selection and positioning of the column of the microfiche 60, the lens means 22 is moved to position the pointer 68 on the lens holder 24 in line with the letter D of the indicia 64, as shown in FIG. 1. In this position, the image frame located at the intersection of "column 5", row D of the microfiche 60 is in alignment with the optical path of the lens means 22. The image frame is viewed directly through the lens means and any focal adjustments required are effected with the adjusting means 26.

If the viewer 10 is utilized under dark conditions wherein there is insufficient lighting to view the microfiche, or if it is desired to construct the viewer of opaque rather than translucent material, the illumination source may be energized through actuation of the switch 38 to thereby illuminate the interior of the viewer.

From the foregoing, it will be appreciated that the present invention provides an inexpensive, compact microfiche viewer adapted to be hand-held during operation. The low cost and compactness of the viewer are achieved by providing for viewing the microfiche directly through the lens means and arranging the microfiche in a cylindrical configuration, thereby avoiding the added cost and bulk normally associated with prior art devices utilizing projection apparatus and display devices. Further, the viewer provides for rapid and accurate positioning of a selected image frame of the microfiche into the optical path of the lens means, and for easy removal and replacement of a microfiche.

Although specific mechanisms and conditions are set forth in the above description, these are merely illustrative of the present invention. Other modifications and/or additions will readily occur to those skilled in the art upon reading the disclosure, and these are intended to be emcompassed within the spirit of the invention.

What is claimed is:

1. An apparatus for viewing a selected image frame of a microfiche, comprising:
   a cylindrical outer wall;
   a cylindrical inner wall coaxial within the outer wall;
   a rotatable cylinder for supporting the microfiche coaxially within the inner wall;
   selection means responsive to rotation of the cylinder for positioning a selected portion of the microfiche in a viewing aperture extending parallel to the center axis of the cylinder;
   lens movable to a selected position in the viewing aperture comprising an optical path extending perpendicularly to the viewing aperture for viewing the selected image frame directly through the lens; and
   indicia on the outer wall to provide for positioning of the lens to a selected position in the viewing aperture.

2. An apparatus as set forth in claim 1 in which the outer and the inner walls are translucent to provide for entry of sufficient light under daylight ambient conditions for viewing the microfiche.

3. An apparatus as set forth in claim 1 further comprising:
   means interconnecting the cylinder and the inner wall for imparting rotation to the inner wall in response to rotation of the cylinder;
   said selection means comprising indicator means on the inner wall positionable to a selected position relative to an index means on the outer wall in response to rotation of the cylinder.

4. An apparatus as set forth in claim 3 in which the microfiche includes a plurality of image frames arranged in parallel columns, further comprising:
   register means on the cylinder for positioning the microfiche on the periphery of the cylinder with the image frame columns extending parallel to the center axis of the cylinder and in alignment with the indicator means.

5. An apparatus as set forth in claim 1 in which the microfiche includes a plurality of image frames arranged in parallel rows, further comprising:
   means on the cylinder for positioning the microfiche on the periphery of the cylinder whereby the image frame rows extend tranverse to the cylinder axis and in alignment with the indicia.

6. An apparatus as set forth in claim 1 in which the inner wall includes a body, further comprising:
   means interconnecting the cylinder and the inner wall for imparting rotation to the inner wall in response to rotation of the cylinder; and
   means on the inner wall for spacing the body from an inside surface of the outer wall to avoid drag of the body with the inside surface during rotation of the inner wall.

7. An apparatus as set forth in claim 1 further comprising:
   means on the cylinder for spacing the periphery of the cylinder from an inside surface of the inner wall to provide clearance therebetween for the reception of the microfiche on the periphery of the cylinder.

8. An apparatus as set forth in claim 1 in which the cylinder is hollow, further comprising:
a base for supporting the outer wall;
illuminating means mounted on the base activatable between an on and off condition;
means for selectively activating the illuminating means; and
means for reflecting the illumination within the hollow cylinder in response to activation of the illuminating means to the on condition.

9. An apparatus for viewing a selected portion of a microfiche, comprising:
a translucent cylindrical outer wall;
a transparent cylindrical inner wall positioned within the outer wall;
a cylinder for supporting the microfiche on its periphery rotatably positioned within the inner wall for positioning a selected portion of the microfiche in a viewing aperture in response to rotation of the cylinder;
lens selectively movable to a position for viewing the selected portion of the microfiche in the viewing aperture; and
indicia on the outer wall to provide for positioning the lens to a selected position in the viewing aperture.

10. An apparatus as set forth in claim 9 in which the microfiche includes a plurality of image frames arranged in parallel columns, further comprising:
means interconnecting the cylinder and the inner wall for imparting rotation to the inner wall in response to rotation of the cylinder;
indicator means on the inner wall having positions corresponding to the positions of the image frame columns; and
index means on the outer wall; whereby rotation of the inner wall positions the indicator means to a selected position relative to the index means for positioning a corresponding image frame column in the viewing aperture.

11. An apparatus as set forth in claim 9 in which the microfiche includes a plurality of image frames arranged in parallel rows, further comprising:
means on the cylinder for positioning the microfiche on the periphery of the cylinder with the image frame rows extending transverse to the cylinder axis and in alignment with the indicia.

* * * * *